United States Patent

Rumpp et al.

[11] Patent Number: 4,491,444
[45] Date of Patent: * Jan. 1, 1985

[54] TOOL HOLDER DEVICE

[75] Inventors: Gerhard Rumpp, Inning; Manfred Spieth, Martinsried; Dieter Scholz, Unterpfaffenhofen, all of Fed. Rep. of Germany

[73] Assignee: Hilti Aktiengesellschaft, Schaan, Liechtenstein

[*] Notice: The portion of the term of this patent subsequent to Mar. 6, 2001 has been disclaimed.

[21] Appl. No.: 392,066

[22] Filed: Jun. 25, 1982

[30] Foreign Application Priority Data

Jun. 29, 1981 [DE] Fed. Rep. of Germany ....... 3125455

[51] Int. Cl.$^3$ .................. B23Q 3/12; B23B 31/10; E02D 7/02
[52] U.S. Cl. .................. 409/234; 173/48; 173/114; 279/19.4; 279/19.6; 279/75
[58] Field of Search .............. 279/1 B, 19.1–19.7, 279/75, 81, 19; 173/13, 48, 114, 115, 131–133, 96, 100, 104, 109, 110, 111; 409/234, 232

[56] References Cited

U.S. PATENT DOCUMENTS

| 3,000,225 | 9/1961 | Taylor | 173/93.6 |
| 3,507,337 | 4/1970 | Chromy | 173/14 |
| 3,536,335 | 10/1970 | Schmuck | 279/81 |
| 4,107,949 | 8/1978 | Wanner et al. | 279/1 B X |
| 4,131,165 | 12/1978 | Wanner et al. | 173/133 X |
| 4,174,113 | 11/1979 | Eckman | 173/132 X |
| 4,366,869 | 1/1983 | Bereiter | 173/109 |
| 4,434,859 | 3/1984 | Rumpp et al. | 279/75 |

FOREIGN PATENT DOCUMENTS 2811328 9/1979 Fed. Rep. of Germany ..... 279/19.6

Primary Examiner—William R. Briggs
Attorney, Agent, or Firm—Toren, McGeady and Stanger

[57] ABSTRACT

A tool holder for a drill capable of performing only rotary drilling or the combination of rotary and percussive drilling includes a tubular retainer member in which the shank of a tool can be inserted. Locking members mounted in the retainer member fit into recesses in the tool shank for holding it in the retainer member. During percussive drilling the locking members are axially displaceable in the recesses and the tool experiences a certain amount of axial play, however, when only rotary drilling is performed the locking members are held against axial displacement by stops so that the tool does not have any axial play. One stop forms a part of the retainer member and another stop is part of a member slidably displaceable relative to the retainer member.

14 Claims, 6 Drawing Figures

TOOL HOLDER DEVICE

SUMMARY OF THE INVENTION

The present invention is directed to a tool holder for use with a drill capable of performing only rotary drilling or the combination of rotary and percussive drilling. A tool is held within a retainer member in the tool holder by locking members which engage in closed ended recesses in the tool shank. When rotary and percussive drilling is performed there is axial play between the locking members and the tool shank.

When the combination of rotary and percussive drilling is carried out, in addition to the rotational motion transmitted to the tool shank, axially directed strokes or percussive movement is also transmitted to the shank. To permit the transmission of the percussive strokes, if possible, without losses, the tool shank is held in the tool holder with a certain amount of axial play. Accordingly, the tool shank is axially movable in the tool holder to a limited extent so that its rear or trailing end comes into direct contact with the front end of an impact anvil. Thus, percussive strokes are transmitted directly from the impact anvil to the tool. As a result, the tool holder itself does not take part in the transmission of the percussive stroke.

Many drilling devices which perform percussive drilling are also equipped for only rotary drilling operation. If rotary drilling alone is being performed, axial play of the tool within the holder has an adverse effect. As an example, if the tool is drilling in a soft material, such as wood, the tool can be partly pulled out of the holder. If this occurs, it is impossible to guide the tool precisely. Furthermore, it is not possible to obtain a predetermined bore depth.

Therefore, the primary object of the present invention is to provide a tool holder which is capable of carrying out the combination of percussive and rotary drilling as well as rotary drilling alone while overcoming the disadvantages mentioned above.

In accordance with the present invention, the tool shank inserted into the tool holder can be held between two stops for securing the tool against axial movement. One stop is part of a retaining member within the tool holder and the other stop is axially displaceable relative to the retainer member and can be fixed in position. At least one of the locking members connecting the tool shank to the retainer member can be gripped in one position of the tool holder between at least one of the stops and a part of the tool shank.

Accordingly, when percussive drilling is performed the tool has the usual axial play relative to the tool holder. When only rotary drilling is carried out, however, the tool is gripped in the axial direction between the two stops. One of the stops is a part of the retainer member in the tool holder. This stop can be formed by a shoulder or a projecting part. The holding action can be engaged by axially displacing and fixing the other stop relative to the retainer member. By securing at least one of the locking members between one of the stops and a surface on the tool, the locking members participate in holding the tool in the axial direction while affording the transmission of torque to the tool. Thus, with respect to the tool, no additional means are necessary for gripping it in the axial direction.

To hold the tool against axial displacement, the stop not forming a part of the retainer member is displaced in the axial direction and is fixed in place relative to the retainer member. To facilitate the locking operation, it is preferable if the other stop which is axially displaceable and fixable in place relative to the retainer member, is arranged on an actuating member. The actuating member can be moved regardless of the operating state of the drilling device. To prevent incorrect handling of the drilling device, the actuation member can be engaged with a changing or switching mechanism for converting from only rotary drilling operation to the combination of rotary and percussive drilling operation. Accordingly, during percussive operation it is assured that the tool is axially displaceable while during only rotary drilling the tool is held against any axial displacement, that is, there is no axial play.

For a compact arrangement it is preferable if the actuating member is a sliding sleeve. By using a sliding sleeve as the actuating member, imbalance in the tool holder is avoided. Moreover, displacement of the sliding sleeve can be effected in any rotary position of the tool holder.

To provide a simple construction of the tool holder, at least one of the locking members can be held or gripped between an axially displaceable stop and a shoulder or surface formed by an axially extending recess in the tool shank. Accordingly, to secure the tool for rotary drilling, a locking member can be displaced axially against a shoulder in an axially extending recess in the tool shank by means of the axially displaceable and fixable stop and then the tool is axially displaced against the fixed stop on the retainer member by means of the other locking member. By securing one of the locking members between the axially displaceable stop and the shoulder in the recess on the tool shank, a positive engagement is provided between the tool shank and the axially displaceable stop so that direct engagement of the displaceable stop with the tool shank is unnecessary.

Further, holding the tool shank against axial displacement is afforded by securing one locking member between a stop formed on the retainer member and a shoulder in another one of the axially extending recesses in the tool shank. Such an arrangement can provide a positive engagement between the stop and the tool shank without having the stop project into the tool shank.

Further, it is possible to position locking members between the stop formed on the retainer member and the tool shank as well as between the tool shank and the axially displaceable and fixable stop. As a result, the tool shank is, in effect, secured at two locking members. In this manner the locking members can be supported at one end or the other against the end surfaces or shoulders of a pair of axially extending closed ended recesses on the tool shank.

To afford a uniform distribution of the forces acting on the tool holder and the tool shank, it is advisable if, when using two locking members, they are arranged diametrically opposite one another. With such an arrangement of the locking members, any imbalance of the tool holder is, to a great extent, avoided. Moreover, a tool shank inserted into the holder in any position, can be locked by turning it through an angle of less than 180°.

To afford further simplification in the handling of the tool holder, it is preferable if four locking members are utilized. With four locking members, the tool shank can be inserted and locked within the tool holder by turning it through an angle of less than 90°. Moreover, employing four locking members reduces the wear on the tool shank as well as on the tool holder.

To permit axial movement of the tool relative to the holder when percussive drilling is carried out, a small amount of radial play between the tool shank and the tool holder is unavoidable. Due to wear, this radial play increases during drilling operation. If a one-sided axial securement of the tool shank is used, the tool may be positioned obliquely in the tool holder. As a result, the cutting tip of the tool no longer rotates in a circle.

To avoid an off-center position of the tool within the tool holder, in accordance with the present invention two locking members are always arranged in diametrically opposite positions relative to one another and they are axially displaceable and can be fixed by means of the actuating member. Accordingly, any axial forces that develop occur in pairs. As an example, where four locking members are used, these locking members can be secured against axial displacement alternately against the front and rear shoulders of the axially extending recesses in the tool shank. The axial forces developed are distributed about the circumference of the tool and any off-center position of the tool in the tool holder is avoided.

Accordingly, the locking members serve both to transmit torque from the tool holder to the tool and also for fixing the tool in the axial direction within the tool holder when only rotary drilling operation is effected. As a result of the considerable circumferential forces in the transmission of torque, relatively high surface pressures occur on the support surfaces of the locking members. To reduce these surface pressures, the locking members are formed as cylindrical rollers in a manner known per se. If more than one locking member is used, the torque transmission and axially fixing functions can be assigned separately to the locking members. Locking members used to fix the tool in the axial direction must not be formed as rollers, rather the locking members can be in the form of balls. Ball-shaped locking members are economical and, moreover, permit a compact construction of the tool holder.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described prefereed embodiments of the invention.

DETAIL DESCRIPTION OF THE INVENTION

Figure 1:
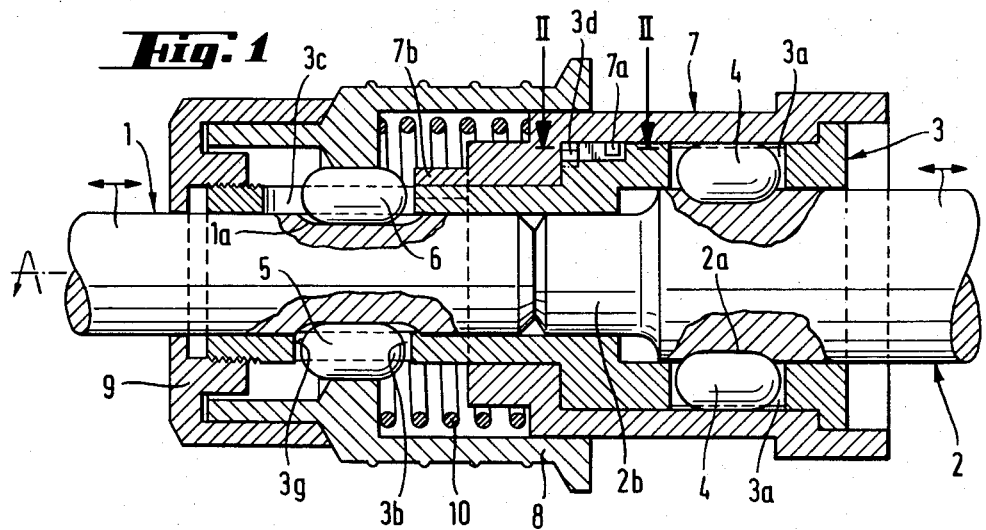
FIG. 1 is an axially extending sectional view of a tool holder embodying the present invention and arranged to perform percussion drilling operations, that is, the tool is not fixed against axial movement.
Figure 3:
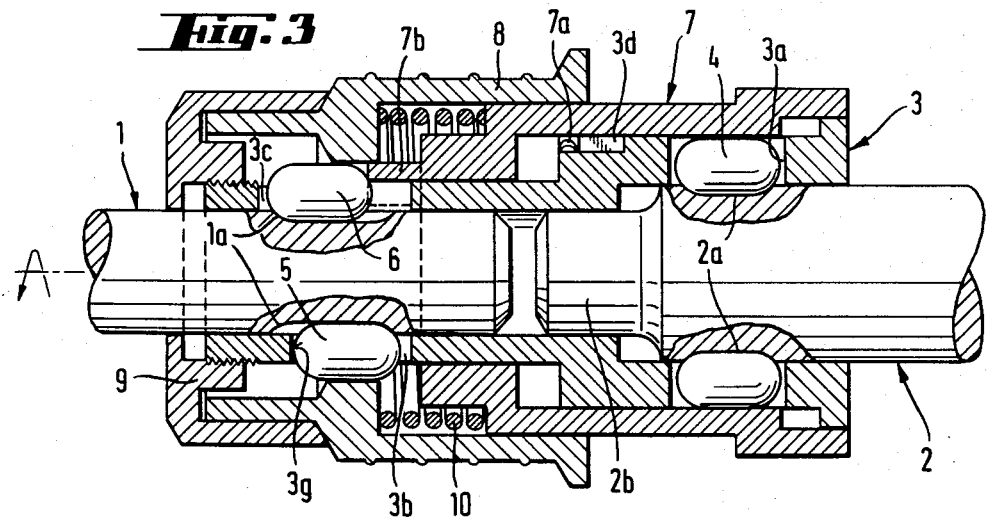
FIG. 3 is an axially extending sectional view of the tool holder, similar to that shown in FIG. 1, however, with the tool held for rotary drilling only, that is, the tool is secured against axial displacement.

In FIGS. 1 and 3 a tool shank 1 is provided with axially extending closed end recesses 1a adjacent its rear end inserted into a retainer member 3 forming a part of a tool holder. Within the retainer member 3 behind the tool shank 1 is a percussion or impact anvil 2 provided with a reduced diameter projection 2b corresponding in diameter to the tool shank 1. Retainer member 3 laterally enclosing the contacting ends of the tool shank 1 and anvil 2 is a sleeve-like member. Retainer member 3 has windows 3a, 3b, 3c. Windows 3a are located in the axially extending region of the retainer member laterally encircling the impact anvil 2 and drive members 4 are positioned in the windows 3a and project into the grooves 2a in the circumferential surface of the impact anvil and thereby provide the engagement between the impact anvil and the retainer member 3. Windows 3b, 3c are located in the axially extending region of the retainer member 3 laterally encircling the rear end portion of the tool shank 1. A locking member 5 is located within the window 3b and another locking member 6 is located within the window 3c and both of these locking members project into the closed ended axially extending recesses 1a in the outer circumferential surface of the tool shank 1. The recesses 1a have a dimension in the axial direction of the tool shank somewhat greater than the axial dimension of the locking members 5,6 so that in the position shown in FIG. 1 there is a certain axial play between the locking members and the recesses 1a in the tool shank 1.

Sliding sleeve 7 is located around the retainer member 3. Intermediate its ends, sliding sleeve 7 has an inwardly projecting cam 7a extending into an L-shaped slot 3d in the retainer member and the sliding sleeve 7 can be locked to the retainer member 3 depending on the position of the cam 7a in the slot 3d. The rear end of an axially displaceable gripping sleeve 8 is arranged around the sliding sleeve 7. As can be seen in FIGS. 1 and 3, if gripping sleeve 8 is moved rearwardly it is displaced out of engagement with the locking member 5 and 6 and the locking members can be displaced radially outwardly from the recesses 1a in the tool shank 1 and the tool can be removed from within the retainer member 3 in the tool holder. Further, a stop 7b projects forwardly from the front end of the sliding sleeve and can be moved into contacting engagement with the rear end surface of the locking member 6. A cap 9 is secured to the front end of the retainer member 3 and forms a closure for the front end of the tool holder. Within the gripping sleeve 8 a helical pressure spring 10 is positioned extending in the axial direction of the tool shank and contacting at one end the sliding sleeve 7 and at the other end the gripping sleeve 8. Spring 10 biases the sliding sleeve 7 and gripping sleeve 8 apart into the position shown in FIG. 1 and the tool shank is secured within the tool holder so that it can experience a certain amount of axial play relative to the retainer member 3.

Figure 2:
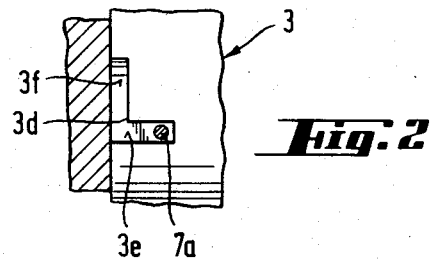
FIG. 2 is a sectional view of the tool holder taken along the line II—II in FIG. 1.

FIG. 2 illustrates the L-shaped slot 3d formed in the outer surface of the retainer member 3. Slot 3d has an axially extending section 3e and another section 3f extending transversely of the axial direction and extending in the circumferential direction on the retainer member. In the position shown in FIG. 1, the cam 7a and the sliding sleeve 7 can be moved in the axial direction relative to the retaining sleeve 3. When the cam 7a reaches the forward end of the section 3e if the sliding sleeve 7 is rotated relative to the retainer member 3, cam 7a enters the section 3f of the slot and moves in the circumferential direction. With the cam 7a in the position shown in FIG. 3, the sliding sleeve is fixed against movement in the axial direction relative to the retainer member 3.

In FIG. 3 the sliding sleeve 7 is shown displaced in the axial direction relative to the retainer member 3 against the biasing force of the pressure spring 10. As a result, the end of stop 7b has moved into contact with the locking member 6 displacing the locking member axially forwardly into contact with the front shoulder of the closed ended recess 1a in the tool shank 1 and pushes the shank in the direction out of the retainer member 3 until the other locking member 5 is in contacting engagement at its front end with the stop 3g and at its rear end with the rear shoulder of the recess 1a in which it is located. Accordingly, the front edge of window 3b forms the stop 3g for the locking element 5 and the stop 3g is a part of the retaining member 3. In the position shown in FIG. 3 the tool shank is held by the locking members 5,6 so that it cannot move in the axial direction. The axial play present in the percussion drilling condition shown in FIG. 1, has now been eliminated. Cam 7a located within the circumferentially extending section 3f of slot 3d prevents the sliding sleeve 7 from being moved axially rearwardly by the pressure spring 10. Tool shank 1 remains secured in this position until the sliding sleeve 7 is rotated relative to the retainer member 3 back into the position shown in FIG. 1 where the pressure spring 10 then moves the sliding sleeve 7 axially rearwardly relative to the retainer member. As can be seen in the drawing, the axial dimension of window 3c is greater than that of window 3b whereby the front end of the locking member 6 moves into contact with the front shoulder of the recess 1a and does not contact the front edge of the window 3c.

Figure 4:
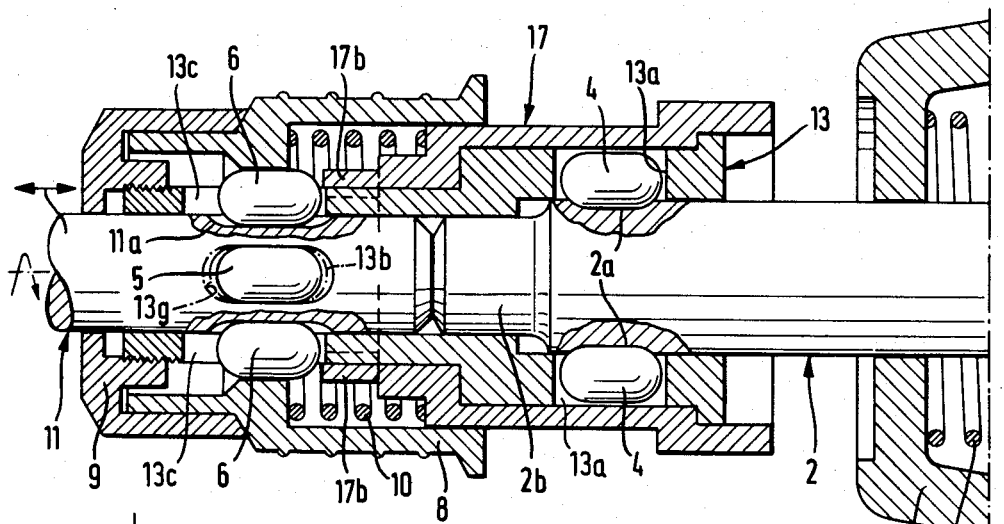
FIG. 4 is a view similar to FIG. 1 of another embodiment of a tool holder incorporating the present invention with the tool arranged to effect a percussion drilling operation.
Figure 6:
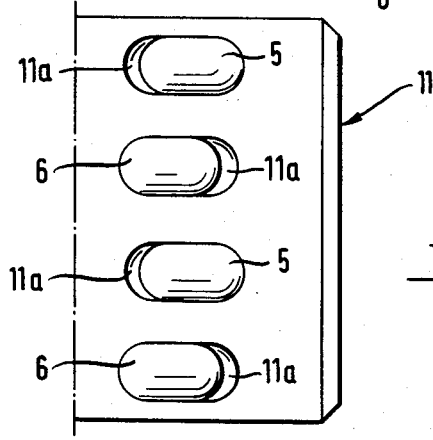
FIG. 6 is a developed view of the tool shank shown in FIG. 5 illustrating the alternating positions of the locking members.
Figure 5:
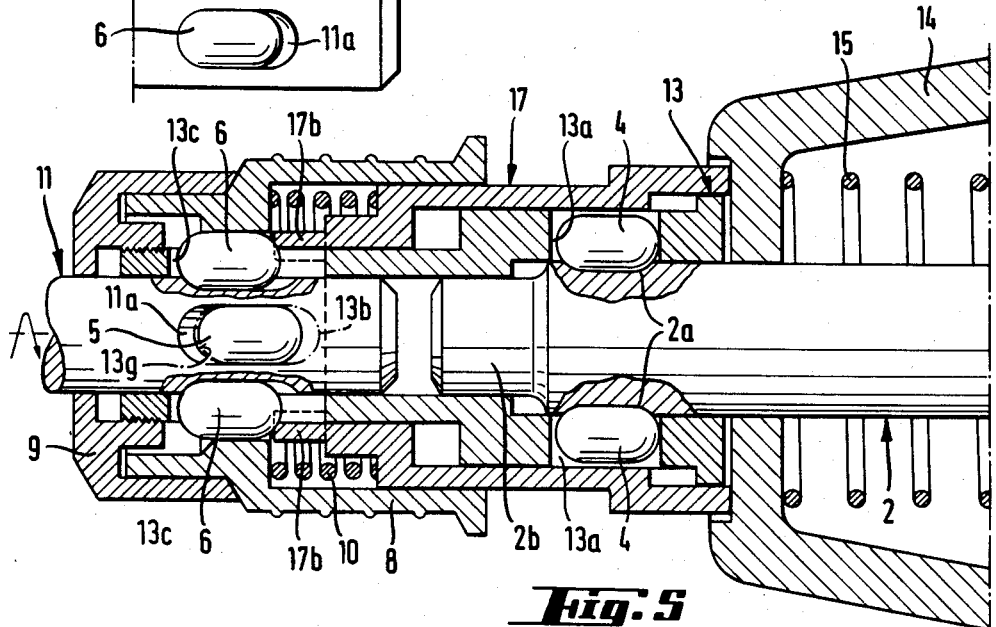
FIG. 5 is a view similar to FIG. 4, however, the tool is secured in position for carrying out rotary drilling operations only.

The tool holder shown in FIGS. 4, 5 and 6 is substantially the same as that shown in FIGS. 1, 2 and 3, accordingly, corresponding parts have been provided with the same reference numberals. The difference between the two embodiments involves tool shank 11 having four recesses 11a with a total of four locking members 5,6, provided, two locking members 5 alternating with two locking members 6. Accordingly, the retaining member 13 has four windows 13b, 13c containing the locking members 5, 6 with two windows 13b containing the locking members 5 and two windows 13c containing the locking members 6. Further, retainer member 13 has two windows 13a for the locking members 4 affording the connection between the impact anvil 2 and the retainer member 3. Windows 13c have a greater length than the windows 13b. Sliding sleeve 17 is provided with two stops 17b extending from its forward end with the stops being arranged diametrically opposite one another. Each of stops 17b acts on a different one of the locking members 6 which are also arranged diametrically opposite one another. In the percussive drilling condition shown in FIG. 4, tool shank 11 has a certain axial play relative to the retainer member 13. A part of housing 14 of the drilling device along with a spring 15 is shown on the right-hand side of FIGS. 4 and 5.

In FIG. 5, the drilling device has been switched to only rotary drilling operation. This switching action is accomplished in a known manner by the displacement of a part of housing 14 relative to the impact anvil 2 via the spring 15, and further discussion of this arrangement is not provided. In the rotary drilling condition the sliding sleeve 17 is in contact with the housing 14 and is displaced in the axial direction relative to the retainer member 13. During the axial movement of the sliding sleeve 17, the stops 17b axially displace the locking members 6 relative to the locking members 5 and the members 5 are moved against the forward edges of the windows 13b with the forward edges forming stops 13g. Thus, in FIG. 5, the tool shank 11 is held in the axial direction against displacement by locking members 5, 6 in a manner analogous to that shown in FIG. 3. Since locking members 5, 6 are present in diametrically opposed pairs, an oblique or off-center setting of the tool shank in the retainer member cannot take place.

As the developed view shows in FIG. 6, where the tool shank 11 is secured against axial displacement, locking members 5 and 6 are alternately located against the rear ends and front ends of the recesses 11a, that is, the locking members 5 contact the rear end shoulders of the recesses 11a and the locking members 6 contact the front end shoulders of the recesses. The tool shank is held by the locking members 5, 6 against movement in the axial direction. Due to the symmetrical arrangement of the axial forces acting on tool shank 11, pitching or tilting moments are avoided.

While specific embodiments of the invention have been shown and described in detail to illustrate the application of the inventive principles, it will be understood that the invention may be embodied otherwise without departing from such principles.

We claim:

1. Tool holder for a drill capable of both only rotary drilling and the combination of rotary and percussive drilling and arranged to receive and hold an axially extending tool shank with the tool shank having axially extending closed ended recesses therein, comprising an axially extending sleeve-like retainer member arranged to receive the tool shank therein, locking members mounted in said retainer member and capable of removable engagement in the axially extending closed ended recesses in the tool shank, said locking members dimensioned in the axial direction of said retaining member so as to be axially displaceable in the recesses in the tool shank, stop means for engagement with said locking members for holding said locking members against axial displacement in the recesses in the tool shank, and said stop means being axially displaceable relative to said locking members for movement between a first position wherein only rotary drilling can be effected and a second position where the combination of rotary and percussive drilling can be effected.

2. Tool holder as set forth in claim 1, wherein said stop means comprises a first stop and a second stop, a sliding member axially displaceable relative to said retainer member and said second stop being formed on said sliding member.

3. Tool holder, as set forth in claim 2, wherein said sliding member is a sliding sleeve laterally encircling said retainer member.

4. Tool holder, as set forth in claims 1, 2 or 3, wherein one of said locking members in the first position is held against axial displacement between said second stop and the shoulder on the end of the recess in the tool shank into which said locking member is arranged to engage.

5. Tool holder, as set forth in claim 4, wherein said first stop is formed on said retainer member and the other said locking member is secured against axial movement between said first stop and the end of said recess into which said other locking member is arranged to engage in the tool shank when the stop means are in the first position.

6. Tool holder, as set forth in claim 5, wherein two locking members are provided in said retainer member and are located diametrically opposite one another.

7. Tool holder, as set forth in claim 5, wherein four said locking members are provided in said retainer member and comprise two pairs of locking members with each said pair being located diametrically opposite one another.

8. Tool holder, as set forth in claim 7, wherein two said second stops are provided on said sliding sleeve diametrically opposite one another so that each of said second stops contact a different one of a diametrically opposed pairs of said locking members.

9. Tool holder, as set forth in claim 1, wherein said retainer member has axially extending windows therein each arranged to contain one of said locking members and said locking members having a dimension in the axial direction smaller than the dimension in the axial direction of said windows.

10. Tool holder, as set forth in claim 9, wherein one of said windows having a greater axial length than the other said window.

11. Tool holder, as set forth in claim 1, wherein a sliding sleeve laterally encircles said retainer member, said retainer member having a first end into which the tool shank can be inserted and an oppositely directed second end, said sliding sleeve is axially spaced from the first end of said retainer member toward the second end thereof, said retainer member having windows therein with said locking members each located in a different one of said windows, said stop means comprises a first stop member formed by the end edge of one of said windows closer to the first end of said retainer member and a second stop formed on and extending from the end of said sliding sleeve closer to the first end of said retainer member.

12. Tool holder, as set forth in claim 11, wherein a gripping sleeve laterally encircles the end of said sliding sleeve closer to the first end of said retainer member and said gripping sleeve extending radially inwardly into contact with said locking members for holding said locking members radially inwardly for engagement within the recesses in the tool shank.

13. Tool holder, as set forth in claim 12, wherein a spring is located within said gripping sleeve and extends in the axial direction of said retainer member with one end of said spring bearing against said gripping sleeve and the other end of said spring bearing against said sliding sleeve for biasing said sliding sleeve into the second position of said stop means.

14. Tool holder, as set forth in claim 13, wherein an L-shaped slot is formed on the radially outer surface of said retainer member with a first section of said slot extending in the axial direction of said retainer member and a second section of said slot connected to and extending transversely of the first section, a cam secured to said sliding sleeve and extending therefrom into said slot in said retainer member and said cam being located in the first section of said slot in the second position of said slot means and in the second section of said slot in the first position of said stop means.

* * * * *

UNITED STATES PATENT AND TRADEMARK OFFICE
CERTIFICATE OF CORRECTION

PATENT NO. : 4,491,444

DATED : January 1, 1985

INVENTOR(S) : Gerhard Rumpp, et al

It is certified that error appears in the above-identified patent and that said Letters Patent is hereby corrected as shown below:

In the heading of the Patent, it should read as follows:

[54] TOOL HOLDER FOR A ROTARY AND PERCUSSIVE DRILLING DEVICE

Signed and Sealed this

Twenty-ninth Day of October 1985

[SEAL]

Attest:

Attesting Officer

DONALD J. QUIGG

Commissioner of Patents and Trademarks—Designate